（12) United States Patent
Ishibe

(10) Patent No.: US 8,584,788 B2
(45) Date of Patent: Nov. 19, 2013

(54) EXHAUST SYSTEM FOR MOTORCYCLE

(75) Inventor: Noriaki Ishibe, Shizuoka (JP)

(73) Assignee: Suzuki Motor Corporation, Shizuoka (JP)

(*) Notice: Subject to any disclaimer, the term of this patent is extended or adjusted under 35 U.S.C. 154(b) by 572 days.

(21) Appl. No.: 12/582,978

(22) Filed: Oct. 21, 2009

(65) Prior Publication Data

US 2010/0101886 A1 Apr. 29, 2010

(30) Foreign Application Priority Data

Oct. 24, 2008 (JP) ................................. 2008-274888

(51) Int. Cl.
*B60K 13/04* (2006.01)

(52) U.S. Cl.
USPC ............................. 180/309; 180/219; 180/296

(58) Field of Classification Search
USPC .................. 180/219, 309, 68.1, 296
See application file for complete search history.

(56) References Cited

U.S. PATENT DOCUMENTS

| 4,860,538 A * | 8/1989 | Takeuchi ........................ 60/313 |
| 6,601,666 B2 * | 8/2003 | Okuma et al. ................ 180/227 |
| 7,364,010 B2 * | 4/2008 | Konno ............................ 181/228 |
| 2008/0210203 A1 * | 9/2008 | Sugiyama .................... 123/509 |
| 2008/0230030 A1 * | 9/2008 | Kawai et al. ............. 123/184.21 |

FOREIGN PATENT DOCUMENTS

| JP | 2001278158 A | 10/2001 |
| JP | 2005313671 A | 11/2005 |

* cited by examiner

*Primary Examiner* — J. Allen Shriver, II
*Assistant Examiner* — Bryan Evans
(74) *Attorney, Agent, or Firm* — Troutman Sanders LLP

(57) ABSTRACT

An exhaust system for a motorcycle includes: an exhaust pipe connected to a cylinder head of an engine; a pair of right and left silencers connected to the exhaust pipe and disposed in right and left sides of a rear wheel respectively, wherein the exhaust pipe is branched into two in a rear of the cylinder head and in a front of a rear wheel suspension system and connected to the pair of right and left silencers respectively.

3 Claims, 8 Drawing Sheets

FIG. 5A
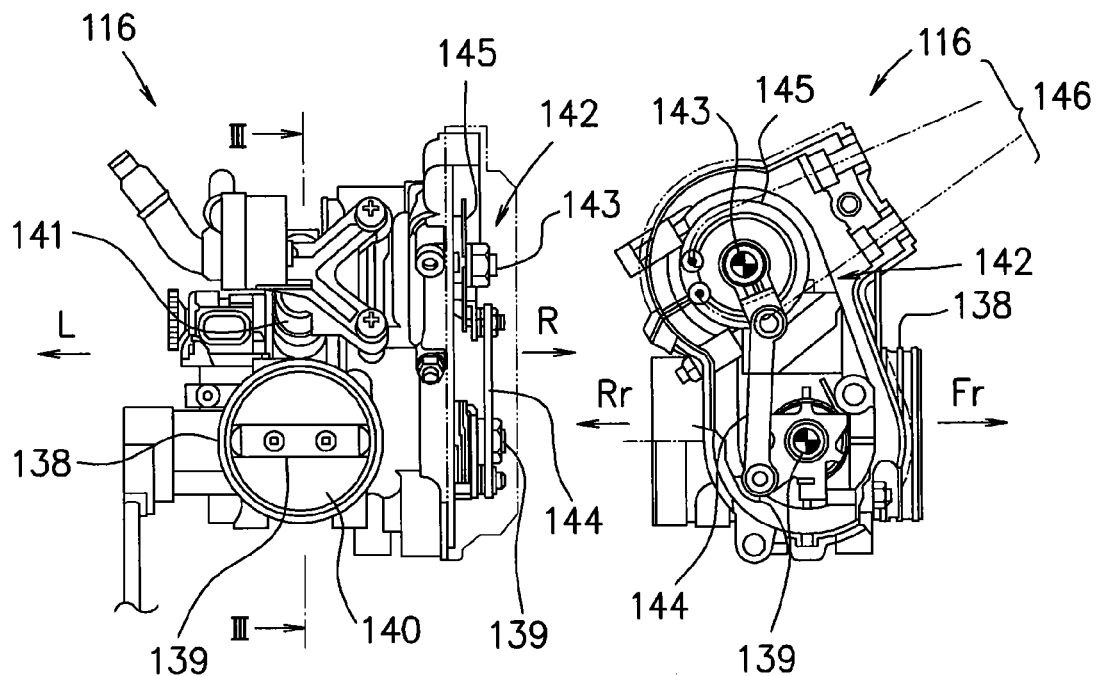
FIG. 5B
FIG. 5C
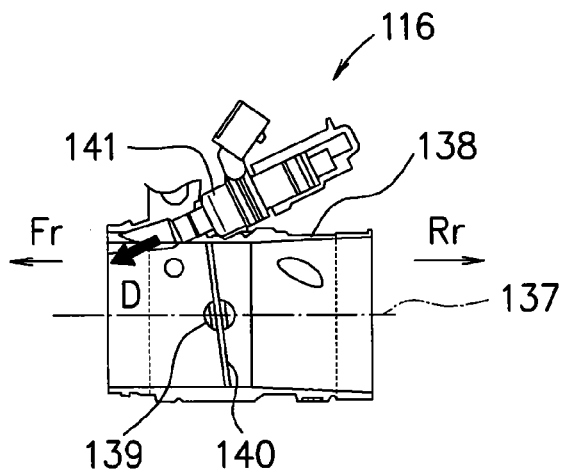
SEC. III-III

EXHAUST SYSTEM FOR MOTORCYCLE

CROSS-REFERENCE TO RELATED APPLICATIONS

This application is based upon and claims the benefit of priority of the prior Japanese Patent Application No. 2008-274888, filed on Oct. 24, 2008, the entire contents of which are incorporated herein by reference.

BACKGROUND OF THE INVENTION

1. Field of the Invention

The present invention relates to an exhaust system for a motorcycle, in particular, for what is called an off-road type motorcycle.

2. Description of the Related Art

In a motorcycle used mainly for off-road driving, a vehicle-mounted component such as an engine is set at a high position in order to secure a large minimum ground clearance of a vehicle body. Since a seat height becomes high as a result, a proper place around a center of a seat is slightly recessed downward in order to improve a foot grounding property. Since the seat is mounted on a vehicle body frame forming a skeletal structure of the vehicle body, a vehicle body frame rear part (vehicle body frame portion positioned below a central part of the seat) is required to be low. In view of the above-described situations, the engine and the vehicle body frame are disposed close to each other.

Besides, an exhaust pipe connected to the engine is required to be installed in a vehicle body layout which is designed quite compactly. In a neighborhood of a vehicle body center in particular, in which a leg portion of a passenger is positioned, since it is necessary that the exhaust pipe does not touch the leg portion, the exhaust pipe is to be installed inside the vehicle body frame.

In a motorcycle for off-road driving described in Japanese Patent Application Laid-open No. 2001-278158 ("JP '158") for example, an exhaust pipe (23) is disposed through the inside of a pivot plate (6). In a space formed inside the pivot plate (6), a vaporizer (24) and a rear cushion (19) and so on are disposed in addition to the exhaust pipe (23).

Further, in a motorcycle for off-road driving described in Japanese Patent Application Laid-open No. 2005-313671 ("JP '671"), a muffler structure of a pair of right and left mufflers is disclosed. One exhaust pipe (50) of these is extended to a side of a cushion unit (33) and branched into two around a rear of the cushion unit (33). One exhaust pipe (50) of the branched two runs across in a vehicle width direction through a space formed in the rear of the cushion unit (33) and in a front of a rear fender front part (42a), with silencers (31, 32) being disposed in right and left sides of a rear wheel (23).

However, in the exhaust system described in JP '158, the vaporizer (24) has a float chamber (24a) in a lower part thereof, necessarily resulting in a large size in a height direction and bulkiness. Besides, since a crankcase (29) is positioned directly below the float chamber (24a), it is practically difficult to secure a space to dispose another part or member under the vaporizer (24).

On the other hand, the exhaust system described in JP '671 has a branch structure in which a branch pipe runs between a cushion unit (33) and a rear fender (42). Therefore, a curvature radius of the branch pipe is small thereby leading to excessive exhaust resistance, so that an exhaust efficiency is reduced and it becomes quite disadvantageous for obtaining engine output. Further, the rear fender (42) is closely disposed in a rear space of the cushion unit (33). Thus, due to necessity of securing a space for passing the exhaust branch pipe, it becomes necessary to move a rear wheel (23) to backward or to move the cushion unit (33) to forward, so that a problem occurs such as a long and large wheel base and a reduced function of the cushion unit (33).

SUMMARY OF THE INVENTION

The present invention is made in view of the above-described circumstances and an object thereof is to provide a motorcycle exhaust system in which an exhaust pipe is efficiently and effectively disposed to be quite effectual to engine performance and the like.

With regard to an exhaust system for a motorcycle of the present invention, in a motorcycle which has: a vehicle body frame including a pair of right and left main frames, a pair of right and left body frames coupled to rear end parts of the main frames respectively, and seat rails provided to bridge between the main frames and the body frames; a rear wheel swingably supported by the vehicle body frame via a rear wheel suspension system; an engine mounted on the vehicle body frame; and an exhaust system coupled to the engine and mounted on the vehicle body frame, the exhaust system includes: an exhaust pipe connected to a cylinder head of the engine; and a pair or right and left silencers connected to the exhaust pipe and disposed in right and left sides of the rear wheel respectively, wherein the exhaust pipe is branched into two in a rear of the cylinder head and in a front of the rear wheel suspension system and connected to the pair of right and left silencers respectively.

Further, in the exhaust system for a motorcycle of the present invention, an intake path is connected to a rear surface of the cylinder head, and the exhaust pipe is branched into two in a region formed below the intake path and above a case main body of the engine, when viewed from a vehicle side.

Further, in the exhaust system for a motorcycle of the present invention, the intake path includes: a throttle body pivotally supporting a throttle valve in the intake path; and an injector mounted on the throttle body and capable of injection-supplying fuel into the intake path, wherein the exhaust pipe is branched into two below the throttle body.

Further, in the exhaust system for a motorcycle of the present invention, the exhaust pipe, after branched into two, is connected to the silencers respectively through spaces formed in the outside in a vehicle width direction of the rear wheel suspension system and in the inside in the vehicle width direction of the pair of right and left body frames.

Further, in the exhaust system for a motorcycle of the present invention, the intake path is disposed disproportionately in one side in the vehicle width direction in relation to the rear wheel suspension system and disposed above one of the exhaust pipes disposed in the same side.

Further, in the exhaust system for a motorcycle of the present invention, the throttle body includes a driving device disposed in the opposite side of the exhaust pipe across the intake pipe of the inside, when viewed from a vehicle side.

BRIEF DESCRIPTION OF THE DRAWINGS

FIG. 5A, FIG. 5B and FIG. 5C are a front view, a side view and a cross-sectional view of a throttle body according to the present invention;

DETAILED DESCRIPTION OF THE PREFERRED EMBODIMENTS

Hereinafter, a preferred embodiment of an exhaust system for a motorcycle by the present invention will be described with reference to the drawings.

Figure 1:
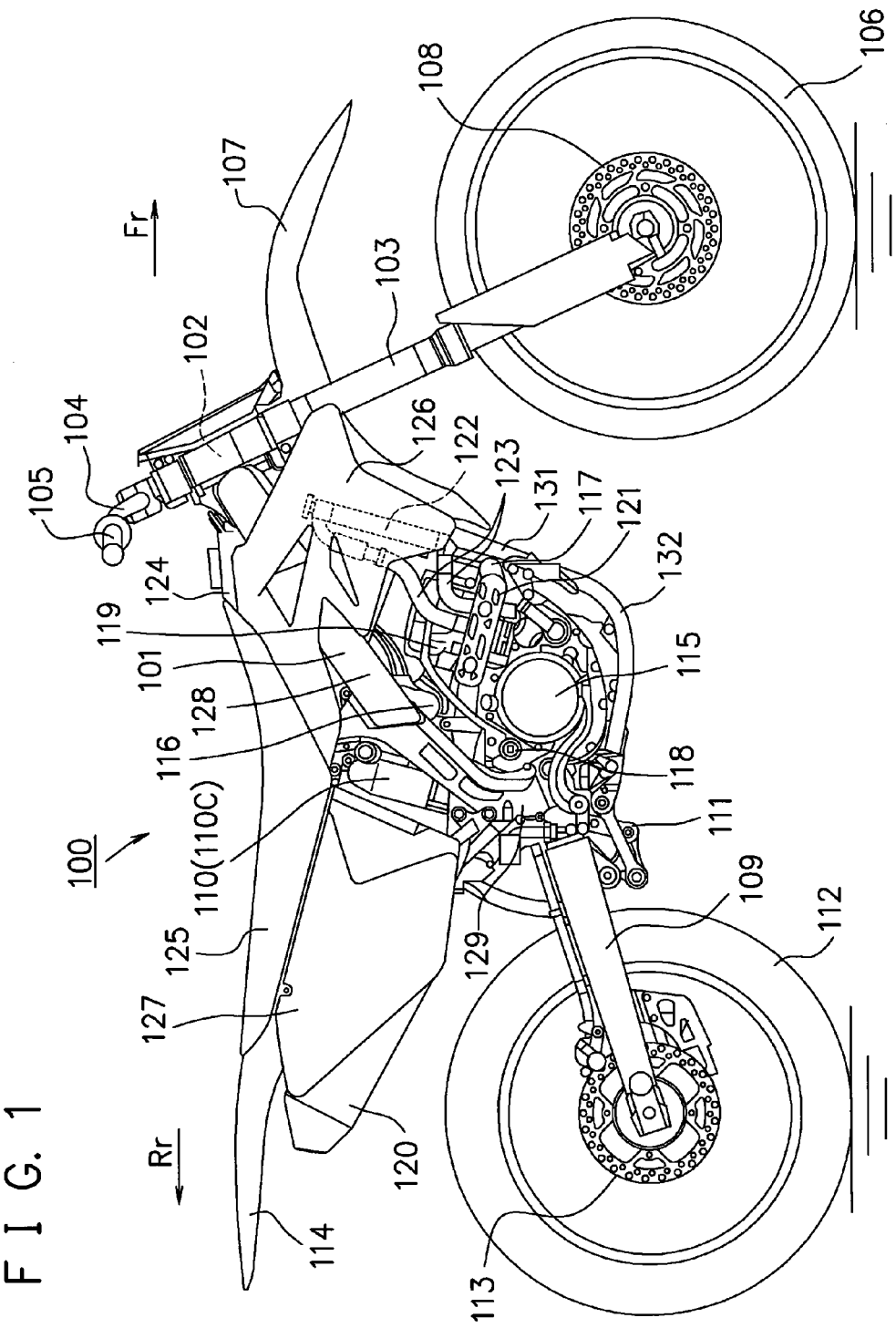
FIG. 1 is a side view showing an overall constitution example of a motorcycle according to an embodiment of the present invention.

The exhaust system for a motorcycle according the present invention is typically applied to an off-road type motorcycle, and in this embodiment a motorcycle shown in FIG. 1 for example is taken as an example. Note that a front of a vehicle is indicated by an arrow Fr and a rear is indicated by an arrow Rr respectively, in a required place in each drawing in association with the following description. Further, the left of the vehicle is indicated by an arrow L and the right of the vehicle is indicated by an arrow R respectively.

Here, first, an overall constitution of a motorcycle 100 according to the present embodiment will be described. In FIG. 1, in a front part of a vehicle body frame 101 made of steel or aluminum alloy material is disposed a pair of right and left front forks 103 supported to be able to pivot right and left by a steering head pipe 102. A handle bar 104 is fixed on an upper end of the front fork 103, and the handle bar 104 has grips 105 (note that a right one of the right and left grips is a throttle grip) on both ends thereof. A front wheel 106 is rotatably supported by lower parts of the front forks 103 and a front fender 107 is fixed in a manner to cover above the front wheel 106. The front wheel 106 has a brake disk 108 to rotate integrally with the front wheel 106.

Details of the vehicle body frame 101 will be described later. In this example, a frame structure is what is called a cradle type frame structure. Swing arms 109 are swingably joined to a rear part of the vehicle body frame 101 and a rear cushion unit 110 (constituting a main part of a rear wheel suspension system) is bridged therebetween. The rear cushion unit 110 has an oil pressure damper, a shock absorber spring, and a sub-tank 110C for operating oil, and an upper end part of the rear cushion unit 110 is supported by a vehicle body frame 101 side while a lower end part thereof is supportively coupled to the swing arms 109 via a link mechanism 111.

A rear wheel 112 is rotatably supported by rear end parts of the swing arms 109. The rear wheel 112 is rotation-driven via a later-described driven sprocket (not shown) around which a chain to transmit a motive power of an engine is wound. The rear wheel 112 has a brake disk 113 to rotate integrally with the rear wheel 112. A rear fender 114 is disposed above the rear wheel 112.

An engine unit 115 mounted on the vehicle body frame 101 is supplied with an air-fuel mixture from an air-fuel mixture supply system (throttle body) 116 and exhaust gas after combustion in the engine is exhausted through an exhaust pipe 117. In the present embodiment, the engine can be a water-cooled 4-cycle (or 2-cycle) single-cylinder engine for example. A cylinder block which includes a cylinder head 119 is joined to an upper side of a crankcase 118 (case main body) in an appropriately forward-bent posture, thereby constituting the engine unit 115. The exhaust pipe 117 is connected to a front part of the cylinder head 119, and bent backward in a right side of a vehicle in this example, further connected to mufflers 120 being silencers through the inside of the vehicle body frame 101 as will be described later. Note that the exhaust pipe 117 is provided with a cover 121 as for a portion corresponding to a leg portion of a rider.

Note that an intake port and an exhaust port communicated with a combustion chamber are formed in the cylinder head 119. The cylinder head 119 has therein an inlet valve open/close controlling the intake port and an exhaust valve open/close controlling the exhaust port, those valves being driven by an intake side cam and an exhaust side cam respectively.

In the engine unit 115 being the water-cooled engine, a radiator 122 constituting a cooling system is disposed in an upper front of the cylinder block. The radiator 122 itself is supported by a proper place of the vehicle body frame 101 via a stay or the like and is connected to the engine unit 115 via a radiator hose 123. Cooling water cooled by the radiator 122 is supplied to a water pump (not shown) and the water pump supplies the cooling water to (a water jacket of) the cylinder block.

Further, a fuel tank 124 is mounted above the engine unit 115 and a seat 125 is continuously provided behind the fuel tank 124. Further, in the vehicle exterior there is provided a side cover 126 to cover the radiator 122 and the fuel tank 124 in the vehicle front, or a rear side cover 127.

Figure 2:
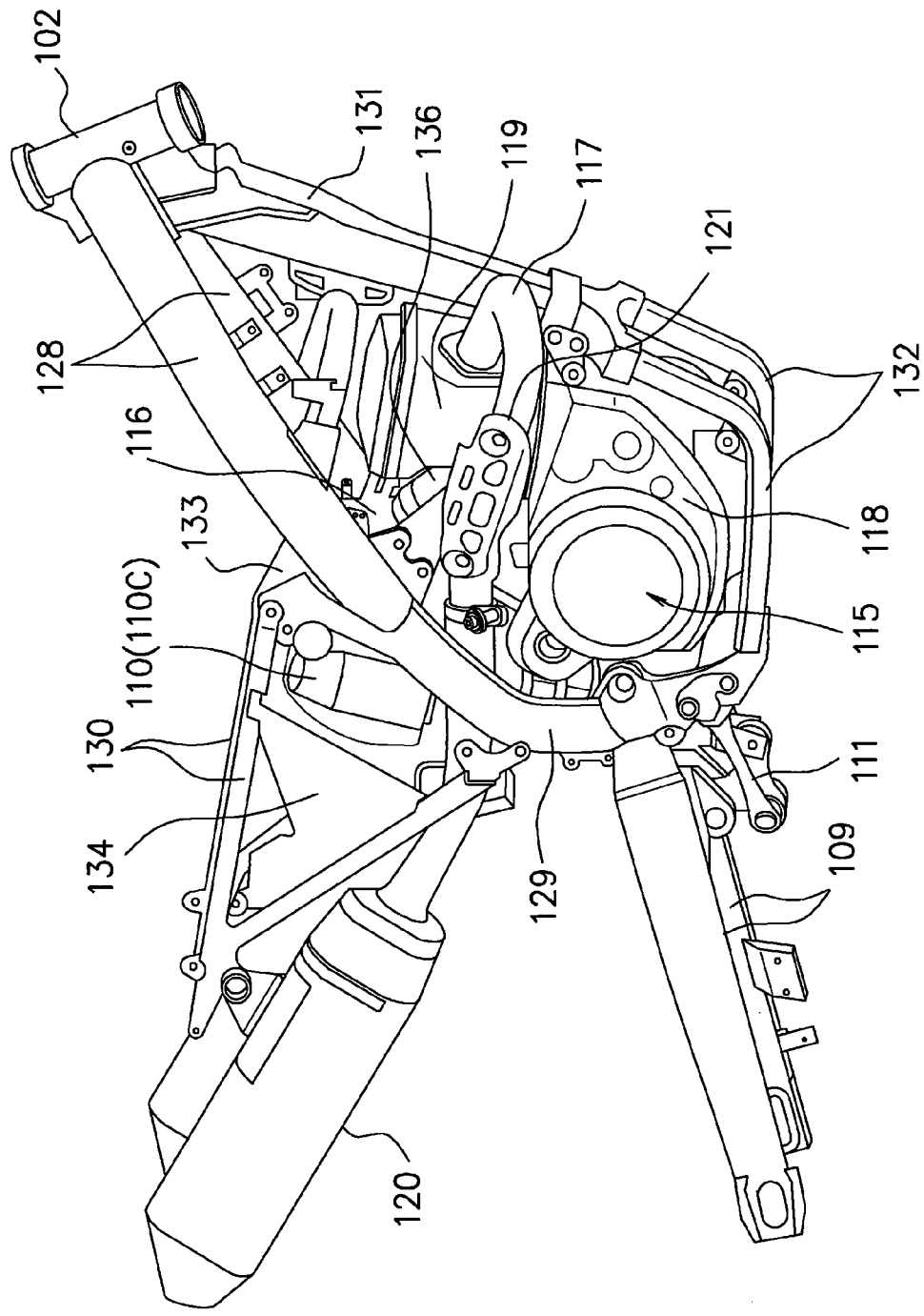
FIG. 2 is a right side perspective view of a neighborhood of a vehicle body frame mounting an engine unit according to the present invention.
Figure 3:
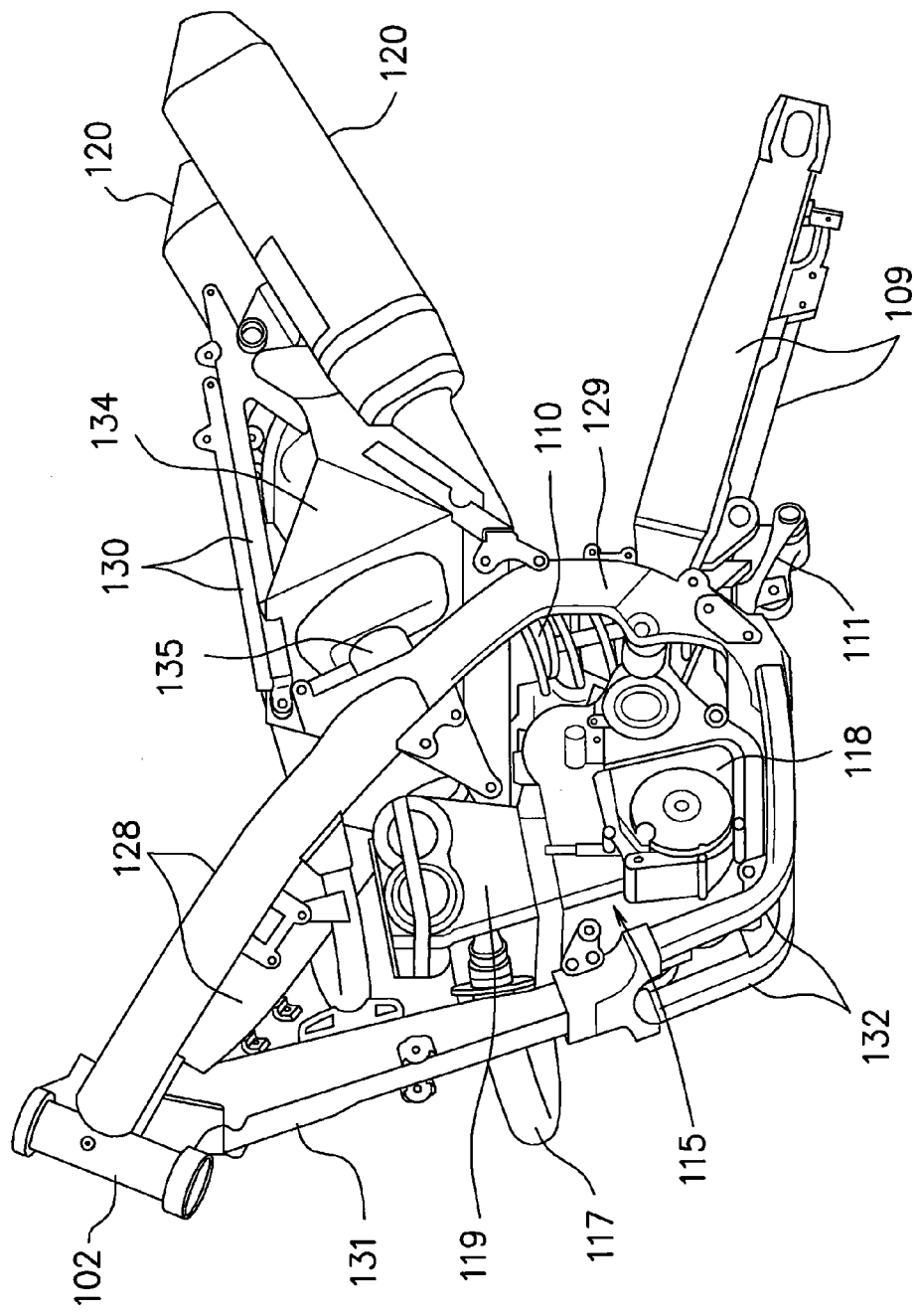
FIG. 3 is a left side perspective view of the neighborhood of the vehicle body frame mounting the engine unit according to the present invention.
Figure 4:
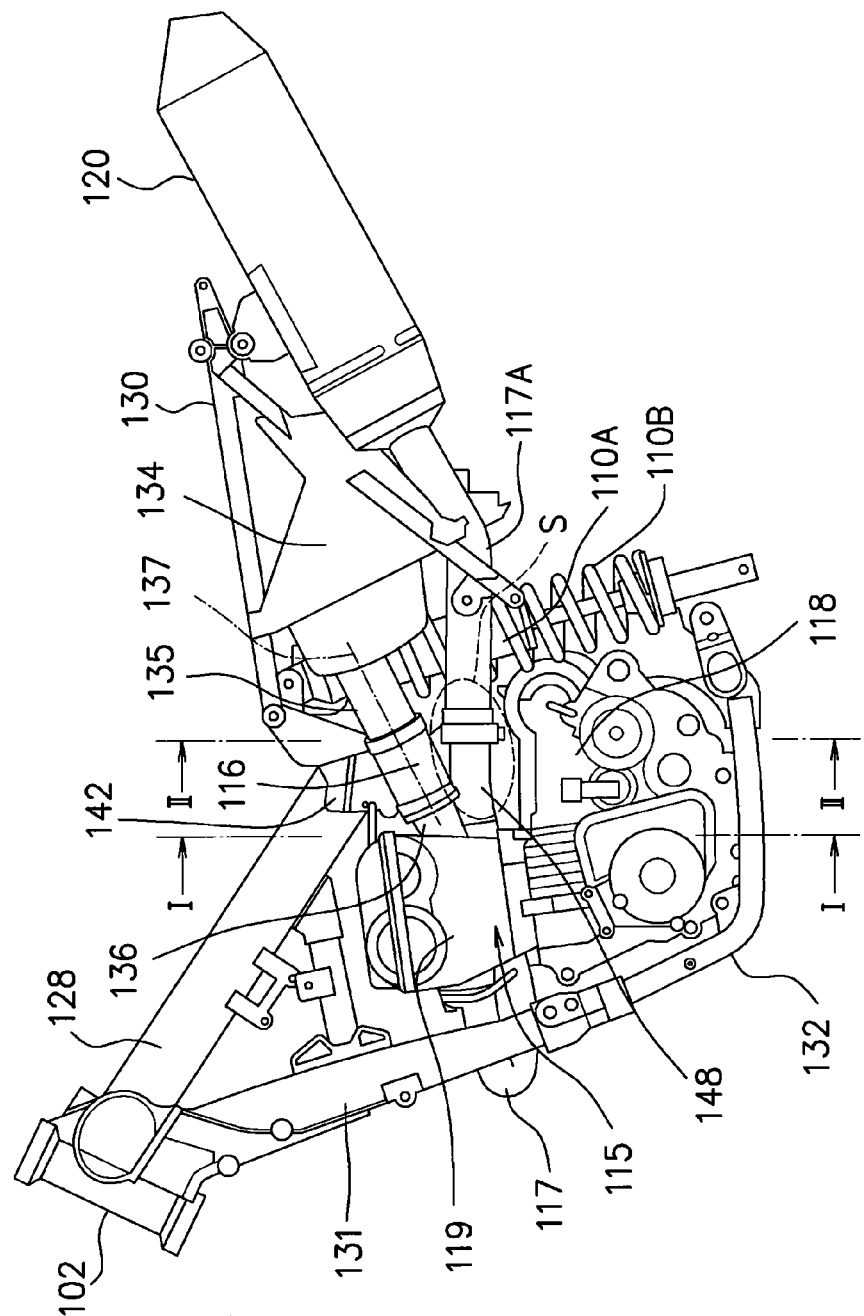
FIG. 4 is a left side view of the neighborhood of the vehicle body frame mounting the engine unit according to the present invention.

Next, FIG. 2 to FIG. 4 each show a neighborhood of the vehicle body frame which mounts the engine unit 115 in the present embodiment. The vehicle body frame 101 includes a pair of right and left main frames 128, a pair of right and left body frames 129 coupled to rear end parts of the main frames 128 respectively, and seat rails 130 provided to bridge between the main frames 128 and the body frames 129. Further, the vehicle body frame 101 has a single down tube 131 extending backward and downward from the steering head pipe 102 and a pair of right and left lower tubes 132 which is branched into a two-pronged shape of right and left in a lower end of the down tube 131 and extends almost parallelly to backward to be coupled to the body frames 129 respectively.

In the above case, the main frame 128 is branched into a two-pronged shape of right and left toward backward from the steering head pipe 102, and each extends slantly backward and downward. Further, the right and left main frames 128 are coupled by a cross member 133 in a neighborhood of upper parts of the body frames 129, and an upper end part of the rear cushion unit 110 is supported by an almost center portion in a vehicle width direction of the cross member 133. Each of the pair of right and left seat rails 130 has a V-shape for example as shown in FIG. 2, and two end parts of the V-shape are coupled to proper places of the cross member 133 and the body frames 129 respectively. A housing space for housing the engine unit 115 or the like is defined in an inner space region surrounded by each frame member of the vehicle body frame 101.

Here, the above-described rear cushion unit 110 has the oil pressure damper 110A, the shock absorber spring 110B, and the sub-tank 110C as shown in FIG. 4 and so on. The rear cushion unit 110 is disposed in an appropriately forward-bent posture in a center position in the vehicle width direction, that is, in a right and left direction with reference to FIG. 6 and so on. Note that the sub-tank 110C is disposed around a right side of the oil pressure damper 110A.

An air cleaner box 134 is mounted and supported by using the seat rails 130 in a rear side of the rear cushion unit 110. In this case, as shown in FIG. 4, the air cleaner box 134 is disposed in an inside region of the almost V shapes of the pair of right and left seat rails 130, from a front end part thereof a connecting tube 135 extending appropriately forward and downward. The connecting tube 135 is connected to the throttle body 116 disposed in a front side thereof, and further, the throttle body 116 is connected to the intake port positioned in a rear surface of the cylinder head 119 via the intake pipe 136.

As shown by a dashed-dotted line in FIG. 4, between the air cleaner box 134 and the cylinder head 119, there is formed an intake path (intake path axis) 137 in which the connecting tube 135, the throttle body 116, and the intake pipe 136 are connected to each other. Air taken in by the air cleaner box 134 is cleaned by an air cleaner housed in the air cleaner box 134 and supplied to the intake port of the cylinder head 119 of the engine unit 115.

Here, the throttle body 116 will be described again. FIG. 5A, FIG. 5B, and FIG. 5C each show a constitution example of the throttle body 116 in the present embodiment. The throttle body 116 has a fundamental figure of an almost cylindrical shape, and has a throttle body main body 138 inside which the intake path 137 is formed, and a throttle valve 140 pivotally supported via a throttle valve shaft 139 in the intake path 137 of the throttle body main body 138. An injector 141 being a fuel injection system is mounted to the throttle body main body 138, and by this injector 141, fuel is injected toward the intake path 137 at a predetermined timing during engine operation (see FIG. 5C, arrow D).

Further, a drive mechanism 142 for opening/closing the throttle valve 140 axially supported by the throttle body main body 138 is provided on a shaft different from the throttle valve shaft 139. In other words, a pivot shaft 143 is disposed in a right side of the throttle body main body 138 and above the throttle valve shaft 139 parallelly thereto. The pivot shaft 143 is coupled to the throttle valve 139 via a link mechanism 144. Further, a throttle pulley 145 is supported coaxially by the pivot shaft 143, and a throttle cable 146 is attached to the throttle pulley 145. On the other hand, the other end of the throttle cable 146 is attached to the throttle grip 105, whereby the pivot shaft 143 of the drive mechanism 142 is made to pivot in correspondence with operation of the throttle grip 105. Therefore, a pivot action of the pivot shaft 143 is transmitted to the throttle valve shaft 139 via the link mechanism 144, so that the throttle valve 140 can be open/close operated.

Now, the exhaust system of the present invention will be further described. Mainly FIG. 6 to FIG. 8 each show a characteristic constitution of the exhaust system of this embodiment. In the present invention, the exhaust system is constituted as described above by the exhaust pipe 117 connected to the cylinder head 119 of the engine and the pair of right and left mufflers 120 (silencers) which is connected to the exhaust pipe 117 and is disposed in the right and left sides of the rear wheel 112 respectively.

Figure 6:
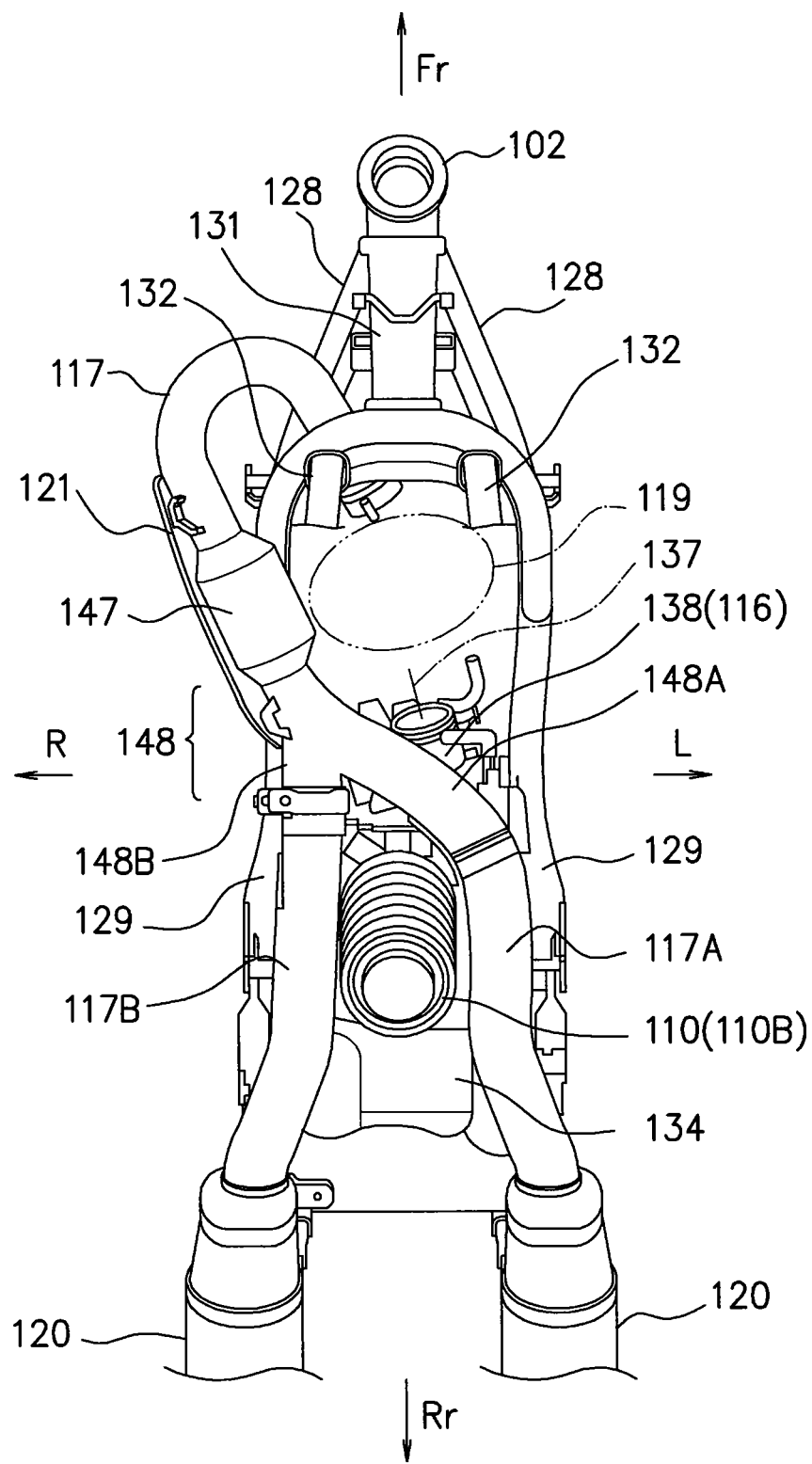
FIG. 6 is a bottom view of an exhaust system of the present invention.
Figure 7:
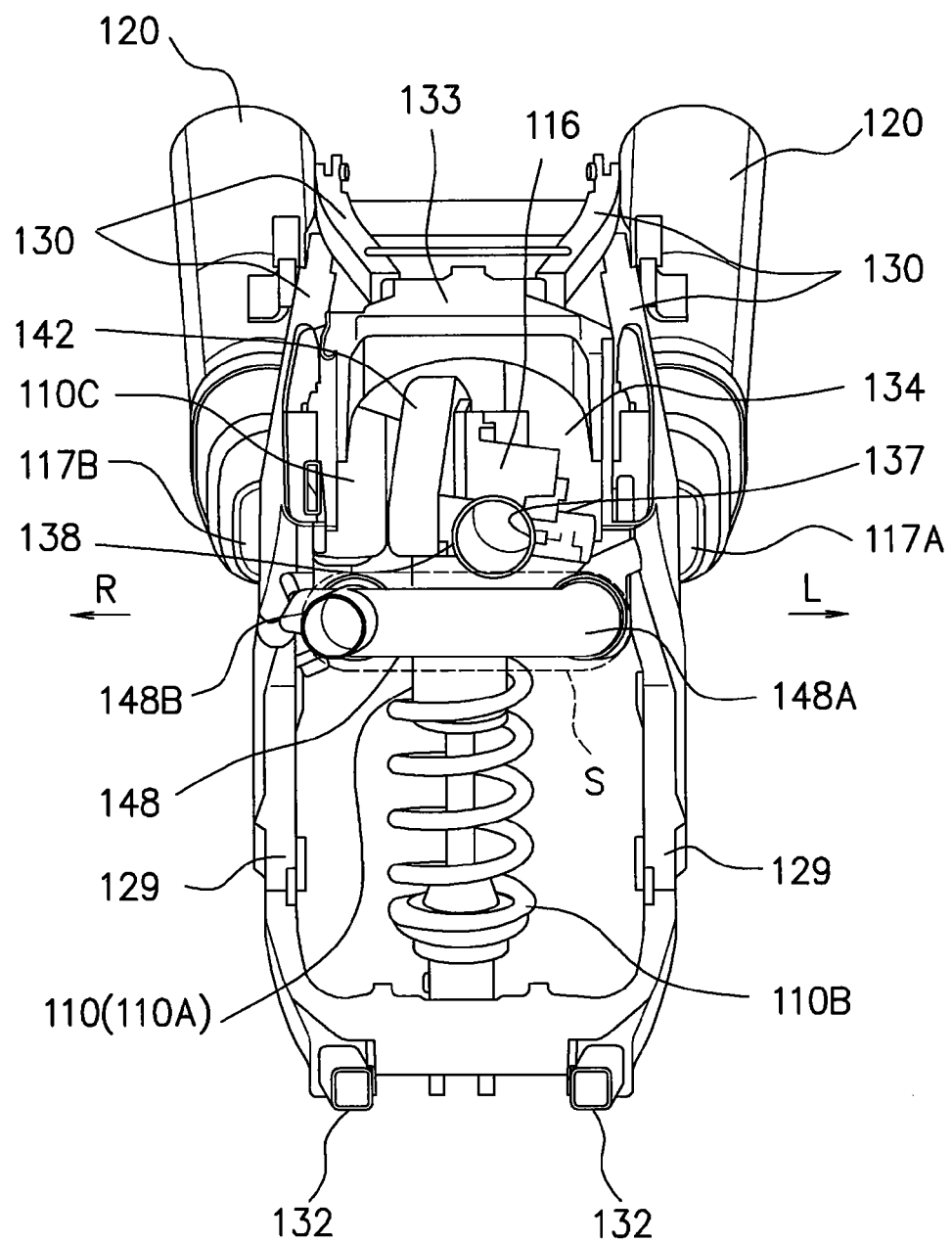
FIG. 7 is a cross-sectional view along a line I-I of FIG. 4.

As shown in FIG. 6, the exhaust pipe 117 is branched into two in the rear of the cylinder head 119 and in the front of the rear cushion unit 110, each is connected to the pair of right and left mufflers 120 respectively. FIG. 6 is a view in which the exhaust system is seen from below. A catalyst attachment section 147 is included in a portion curved from a front part toward the rear of the cylinder head 119 in FIG. 6 and in a right side of the cylinder head 119, and a branch section 148 made of branch pipes 148A and 148B branched into right and left is connected immediately in a rear of the catalyst attachment section 147. The branch pipes 148A and 148B have a modified V-shape for example, and the rear cushion unit 110 is disposed between the exhaust pipes 117A and 117B connected to each end of the V-shape respectively.

Note that when a branch section 148 is to be formed or manufactured, there can be used a method in which two divided parts in an upper and lower bi-block constitution are united by welding, or other methods.

Since the branch section 148 of the exhaust pipe 117 can be disposed in the front of the rear cushion unit 110, constraint by the rear cushion unit 110 is drastically reduced when the exhaust pipe 117 is routed and disposed. Thereby, a curvature radius of the exhaust pipe 117 (mainly a portion of the branch section 148) is enlarged, thereby enabling reduction of exhaust resistance. If the exhaust pipe 117 is branched in a rear region of the rear cushion unit 110, a curvature radius of the branch section 148, particularly of the left side exhaust pipe 117A becomes small, resulting in increase of the exhaust resistance of the left side exhaust pipe 117A, so that disproportion occurs in a flow of exhaust gas compared with the right side exhaust pipe 117B. Thus, it is not possible to effectively exhibit a silencing performance of the two mufflers 120.

Further, the intake path 137 is connected to the rear surface of the cylinder head 119 as described above, and the exhaust pipe 117 is branched into two in a region formed below the intake path 137 and above the crankcase 118 of the engine when viewed from a vehicle side. In other words, as shown in FIG. 4 (or FIG. 7), a region S which can be a gap is formed between the intake path 137 and the crankcase 118. By effectively using this region S, the branch section 148 is disposed in the region S.

The air cleaner box 134 is disposed in a rear side of the intake path 137 (end part of an upstream side in an intake flow direction). With this regard, if the exhaust pipe 117 is disposed in a position higher than the intake path 137, it becomes necessary to form a recession or the like in the air cleaner box 134 in order to evade interference between the exhaust pipe 117 and the air cleaner box 134, and a capacity of an air cleaner may be reduced thereby causing reduction of intake efficiency. By disposing the exhaust pipe 117 in a position lower than the intake path 137, such a problem can be prevented in advance.

Further, the throttle body 116 is disposed in the intake path 137, while the exhaust pipe 117 is branched into two below the throttle body 116. As is obvious from FIG. 5, a space can be secured below the throttle body which does not have a float chamber.

The air-fuel mixture supply system disposed in the intake path 137 is the throttle body 116 using the fuel injection system (injector 141) in the present invention, whereby a bulge such as a float chamber of a vaporizer can be eliminated. A sufficient space can be secured between the intake path 137 and the crankcase 118, whereby the exhaust pipe 117 can be branched in the region S, below the throttle body 116 as described above.

Figure 8:
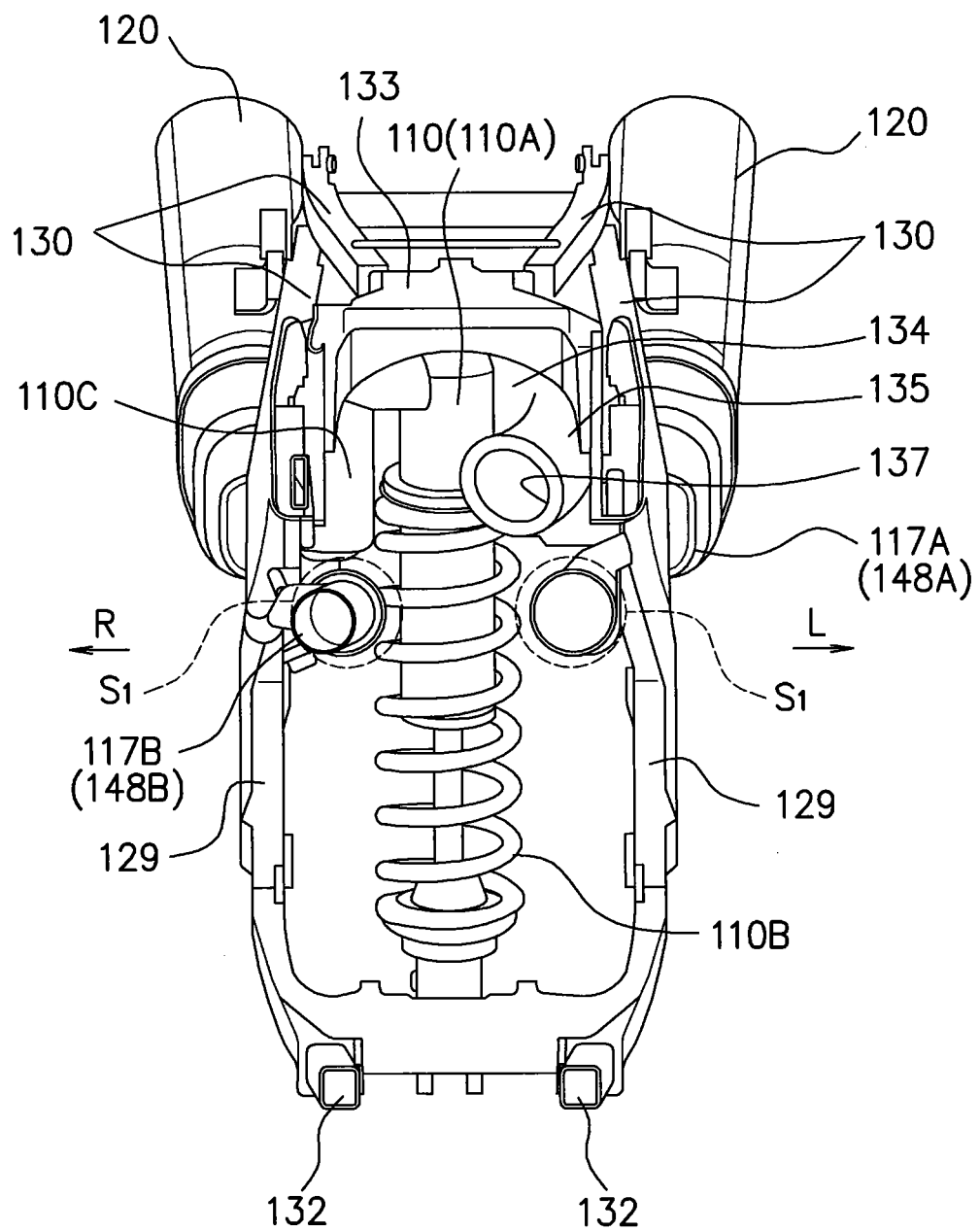
FIG. 8 is a cross-sectional view along a line II-II of FIG. 4.

Further, the exhaust pipe 117, after branched into two in the branch section 148, is connected to the mufflers 120 through spaces which are formed in the outside in the vehicle width direction of the rear cushion unit 110 and in the inside in the vehicle width direction of the pair of right and left body frames respectively. In other words, as shown in FIG. 8, spaces S1 are formed in respective right and left sides of the rear cushion unit 110, and by using these spaces S1, the exhaust pipe 117 (mainly, the exhaust pipe 117A and 117B) is disposed.

Though the exhaust pipe is divided into two as described above, the exhaust pipes 117A and 117B can be prevented from extending toward vehicle sides by routing the exhaust pipes 117A and 117B through the inside of the body frame 129. Thereby, it is possible to lay out the exhaust pipe 117 while securing a good foot grounding property for a rider.

Further, the intake path 137 is disposed disproportionately in one side in the vehicle width direction in relation to the rear cushion unit 110 and disposed above one of the exhaust pipes 117 disposed in the same side. In other words, there is formed the intake path 137 running through the connecting tube 135, the throttle body 116 and the intake pipe 136 as described above, from the air cleaner box 134 toward a downstream side in the intake flow direction. In this example, the connecting tube 135 is disposed in a left side of the rear cushion unit 110 as shown in FIG. 8, forming the intake path 137 from the connecting tube 135 toward the rear surface of the cylinder head 119 as in FIG. 4. As is obvious from FIG. 8 or FIG. 4, the intake path 137 is positioned almost above the exhaust pipe 117A (including part of the branch pipe 148A) disposed in the left side of the rear cushion unit 110.

When disposing the intake path 137 in a manner to bypass the rear cushion unit 110 as described above, it is constituted so that the intake path 137 is disposed above the exhaust pipe 117. Thereby, the intake path 137 and one (in the left side) of the exhaust pipes 117 can be disposed efficiently in terms of space.

Further, when viewed from the vehicle side (see FIG. 4 and so on), the throttle body 116 (throttle body main body 138) has the driving system, that is, the drive mechanism 142, which is disposed in an opposite side of the exhaust pipe 117 across the intake path 137 of the inside.

Disposition of the drive mechanism 142 for driving the throttle valve 140 in the throttle body 116 in a manner to be apart from the exhaust pipe 117 prevents exposure to a high temperature, so that appropriate and smooth operation of the drive mechanism 142 is assured. Furthermore, throttle response to the throttle grip 105 is improved, thus affecting operationality, safety or the like of a vehicle quite effectively.

As described above, according to an exhaust system of the present invention, a motorcycle equipped with an electronic fuel injection system includes a throttle body 116 (in which a throttle valve is axially supported to be able to pivot) and an injector 141 as an air-fuel mixture supply system to replace a vaporizer. In a case of the fuel injection system, unsimilarlly to the vaporizer, the throttle body 116 does not have a float chamber, so that a comparatively large space (region S) can be secured below an intake path 137. Thus, by effectively using the space below the throttle body 116, an exhaust pipe 117 is led to this space and the exhaust pipe 117 is branched into two branch pipes of 148A and 148B in that space. Thereby, bending of the exhaust pipe 117 is restrained to the utmost, so that an exhaust system layout with small exhaust resistance can be realized.

If an exhaust pipe is branched behind a rear cushion unit as in JP '671 for example, it is necessary that the exhaust pipe runs across in a vehicle width direction in a small space where a space in a front and rear direction is limited in order to evade interference with a rear wheel disposed further behind the rear cushion unit. Thus, a curvature radius in a branch pipe becomes small thereby to increase exhaust resistance, resulting in a large difference in an exhaust characteristic to as far as right and left silencers, between the right and the left branch pipes. By a constitution in which the exhaust pipe 117 is branched between the cylinder of the engine unit 115 and the rear cushion unit 110 as in the present invention, the exhaust resistance is reduced to allow exhaust gas to flow smoothly. Further, a difference between right and left exhaust paths to reach mufflers 120 becomes hard to occur, so that freedom in setting with regard to both an output and sound deadening is increased.

Note that in a case of a vaporizer, due to a constitution in which fuel is once stored in a float chamber formed in a lower part, there is a possibility that disposing an exhaust pipe below an intake path can lead to fuel shortage because percolation occurs in the fuel in the float chamber due to heat of the exhaust pipe and that an appropriate amount of the fuel cannot be supplied. In contrast, a fuel injection system does not have a float chamber and it is constituted so that fuel is sprayed from the injector 141 mounted on the upper part of the intake path 137, and so generation of fuel percolation due to influence of heat of the exhaust pipe 117 can be prevented effectively.

Further, in an intake path structure of the present invention, the drive mechanism 142 for open/close the throttle valve 140 axially supported by the throttle body 116 is provided on a shaft different from the throttle valve shaft 139. By disposing the pivot shaft 143 of the drive mechanism 142 in the opposite side (above the intake path 137, that is, in a side in which the injector 141 is disposed) of the exhaust pipe 117 in relation to the intake path 137, influence of heat to the drive mechanism 142 can be reduced. The drive mechanism 142 has the throttle pulley 145 coaxially with the pivot shaft 143, and the pivot shaft 143 of the drive mechanism 142 is to be pivoted in correspondence with operation of the throttle grip 105 provided in the handle bar 104. Pivot of the pivot shaft 143 is transmitted to the throttle valve shaft 139 via the link mechanism 144, so that the throttle valve 140 can be open/close operated. By disposing the drive mechanism 142 in the opposite side of the exhaust pipe 117 across the intake path 137 as describe above, the throttle cable 136 can be apart from the exhaust pipe 117 thereby being able to reduce influence of heat.

The present invention is described with various embodiments hereinabove, but the present invention is not limited only to these embodiments, and modification or the like is possible within the scope of the present invention.

In the above embodiments, though the example is described in which the fuel injection system (which includes the throttle body and the injector) is used. However, even in a case of using a vaporizer instead of the fuel injection system, a constitution is possible in which an intake path is slanted backward and upward thereby to make a downdraft vaporizer, a space being secured below a float chamber of a lower part of the vaporizer and an exhaust pipe being branched into two in that space.

The present invention is described about a case of a single cylinder engine in particular, but the present invention can be also effectively applicable to a multi-cylinder engine and in any of these cases similar operation and effect in cases of the above embodiments can be obtained.

According to the present invention, a comparatively large space can be secured below an intake path, and by effectively using a space below a throttle body, it is possible to lead an exhaust pipe to this space and to branch the exhaust pipe into two in this space. Thereby, bending of the exhaust pipe is retrained to the utmost, so that an exhaust system layout with small exhaust resistance can be realized.

On that occasion, by installing the exhaust pipe inside a body frame, the branched exhaust pipes can be prevented from extending to vehicle sides. Thereby, there can be obtained an effect such that the exhaust pipe can be laid out while a good foot grounding property for a rider is secured.

Further, when the intake path is disposed in a manner to bypass a rear cushion unit, it is constituted so that the intake path is disposed above the exhaust pipe, whereby the intake path and one of the exhaust pipes can be disposed efficiently in terms of space.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. An exhaust system for a motorcycle which has: a vehicle body frame including a pair of right and left main frames, a pair of right and left body frames coupled to rear end parts of the main frames respectively, and seat rails provided to bridge between the main frames and the body frames; a rear wheel swingably supported by the vehicle body frame via a rear wheel suspension system; an engine mounted on the vehicle body frame; and an exhaust system coupled to the engine and mounted on the vehicle body frame, the exhaust system comprising:

an exhaust pipe connected to a cylinder head of the engine; and a pair of right and left silencers connected to said exhaust pipe and disposed in right and left sides of the rear wheel respectively, wherein said exhaust pipe is, after being curved, routed extending rearward in one side in a vehicle width direction, through a region formed below an intake path and above a case main body of the engine in a rear of the cylinder head and in a front of said rear wheel suspension system, when viewed from a vehicle side, and connected to the silencer of an other side in the vehicle width direction through space formed in the outside in the vehicle width direction of the rear wheel suspension system and in the inside in the vehicle width direction of the body frame of the other side, and said exhaust pipe is provided a branch section in the region in which a branch pipe is branched, and the branch pipe being connected to the silencer of the one side in the vehicle width direction through space formed in the outside in the vehicle width direction of the rear wheel suspension system and in the inside in the vehicle width direction of the body frame of the one side.

2. The exhaust system for a motorcycle according to claim 1, the intake path comprising:

a throttle body pivotally supporting a throttle valve in the intake path; and an injector mounted on said throttle body and capable of injection-supplying fuel into the intake path, wherein said exhaust pipe is branched into two below said throttle body.

3. The exhaust system for a motorcycle according to claim 2, wherein said throttle body comprises a driving device disposed in the opposite side of said exhaust pipe across the intake pipe of the inside, when viewed from a vehicle side.

* * * * *